(12) United States Patent
Bacon

(10) Patent No.: X7104
(45) Date of Patent: Jun. 4, 1832

(54) WATER,WHEEL, HORIZONTAL

(76) Inventor: Asahel Bacon

Asahel Bacon
Letters Patent

The Schedule referred to in these Letters Patent and making part of
the same containing a description in the words of the said Asahel Bacon
~~himself~~ of his improvement in the mode of letting water on horizontal
wheels for Mills

---

Be it known that I Asahel Bacon of the town of Windsor, County of
Broome and State of New York have made an improvement in the mode of
letting water on horizontal wheels for mills which is described as follows.
The flume or penstock is made of a square or oblong form it has one opening
at each end for letting the water on and two at each end for letting it off.
When used for a tide mill the water is admitted by raising a flood gate at
either end. it then descends through two openings made in the deck or cover
of the flume into sluices or throats and strikes the Buckets of the Wheels at both
ends of the flume at the same time thus turning it with a double effect. By hoist
ing the gates at the end the water passes off thro' proper channels or races. the
water from one opening passing round with the wheel about a semicircle
returns in a channel near the side of the flume & passes off at the end. When
used for a stream or current the water is admitted through one floodgate
only and operates the same as the tide mill in turning the wheel. The invention
here claimed and desired to be secured by Letters Patent is the before describ
ed method of letting the water on Horizontal Wheels for Mills. For a further
illustration of my Invention I refer to the drawing and model of the same depos
ited in the Patent Office. In testimony whereof I have hereunto subscribed
my name this 31st day of May 1832

Witnesses
William P. Elliot
William G. Granch

Asahel Bacon

Ex^d
C. J. N.

375 [illegible]

[illegible]